United States Patent [19]

Carisey

[11] 3,870,247

[45] Mar. 11, 1975

[54] CASSETTE-HANDLING SYSTEM

[75] Inventor: Camille Carisey, Creteil, France

[73] Assignee: Compagnie Industrielle Des Telecommunications Cit-Alcatel, Paris, France

[22] Filed: July 28, 1972

[21] Appl. No.: 276,050

[30] Foreign Application Priority Data

July 30, 1971 France .............................. 71.28141

[52] U.S. Cl. ....................... 242/198, 74/469, 360/96

[51] Int. Cl. ....................... G11b 23/10, G11b 15/66

[58] Field of Search ........... 242/198, 199, 200, 210; 179/100.2 Z; 274/4 C, 4 D, 4 E, 4 F, 11 C, 11 D; 74/469; 360/93, 96

[56] References Cited

UNITED STATES PATENTS

| | | | |
|---|---|---|---|
| 3,394,898 | 7/1968 | Laa | 179/100.2 Z |
| 3,609,844 | 10/1971 | Ichikawa | 242/198 |
| 3,623,678 | 11/1971 | Housman et al. | 242/198 |
| 3,635,423 | 1/1972 | Lennie | 242/198 |
| 3,675,876 | 7/1972 | Frederick | 274/4 E |

*Primary Examiner*—George F. Mautz
*Attorney, Agent, or Firm*—Craig & Antonelli

[57] ABSTRACT

A device for receiving cassettes of a recording or reading apparatus, consisting of a pivotable housing connected to a pivotable cradle, the latter being mounted on a casing enclosing the drive arrangement for the cassette. The cradle being actuated by a cam and linkage arrangement to assume three positions, that is, driving, automatic loading, and automatic ejection, the opening of the housing allowing for the manual loading or unloading of the cassette.

17 Claims, 2 Drawing Figures

CASSETTE-HANDLING SYSTEM

The present invention concerns cassette-handling systems.

Cassettes containing tapes or wires for recording signals in various ways, for example thermically, mechanically, optically, electrically or magnetically, are finding increasing applications in domestic and industrial environments. This is particularly so in the case of cassettes for magnetically and optically recording signals, which find application in the home for recording music, speech, television programs or home movies, and in industry for data processing, including machine tool programming, accounting and scientific calculation.

The increasing exploitation of cassettes, which are highly convenient because of their flexibility of use, transport and storage, depends on the development of automatic devices for rapidly recording, playing back, transporting, storing, rewinding and selecting portions of the recording medium. This is particularly so when the cassettes contain data for transfer to a computer.

The present invention is intended to provide an improved cassette-handling system.

In accordance with the present invention a cassette-handling system comprises a housing formed with guide and retaining means for a cassette pivoted to a cradle which is in turn pivoted to a casing containing a cassette drive system, so that when the housing is pivoted to lie against the cradle and the cradle is pivoted to lie against the casing a drive element of the cassette drive system passes through an aperture in the cradle to engage the cassette and drive the medium contained therein.

The cassette-handling system is particularly suitable for automatic cassette-handling apparatus such as a cassette storage and distribution system, a cassette based memory system for data, or a control or testing device in a cassette production or assembly chain.

The invention will now be described in more detail, by way of example only and with reference to the accompanying diagrammatic drawings in which.

Figure 1:
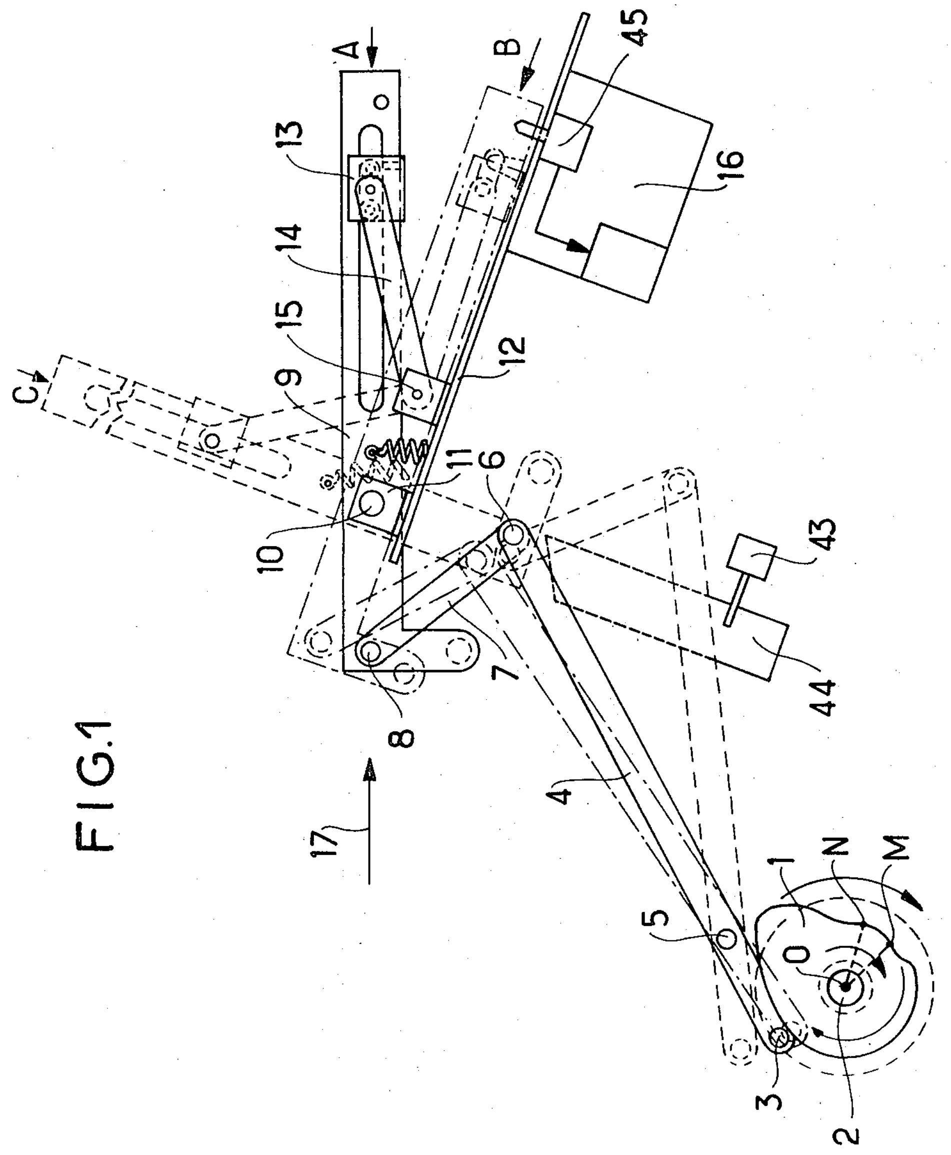
FIG. 1 is a schematic side elevation of the cassette-handling system.

Referring to FIG. 1, a cam 1 is rotatable on a shaft 2 and engages a cam follower 3 at one end of a lever 4 pivoted about a fixed axle 5. The opposite end 6 of the lever 4 is pivoted to one end of a link 7 whose other end is pivoted about an axle 8 at one end of a bar 9. The bar 9 is pivoted about an axle 10 carried in lugs 11 on a fixed plate 12. A carriage 13 slides in a longitudinal slit in the bar 9, being pivoted to one end of a link 14 whose other end is pivoted about a fixed axle 15 on the plate 12. A motor assembly 16 is mounted on the plate 12, and forms part of a cassette drive system.

A complete rotation of the cam 1 produces a cycle of movement of the bar 9 from a first position A corresponding to a cassette-loading position to a second position B corresponding to a cassette-driving position and then to a third position C corresponding to a cassette-ejecting position.

Figure 2:
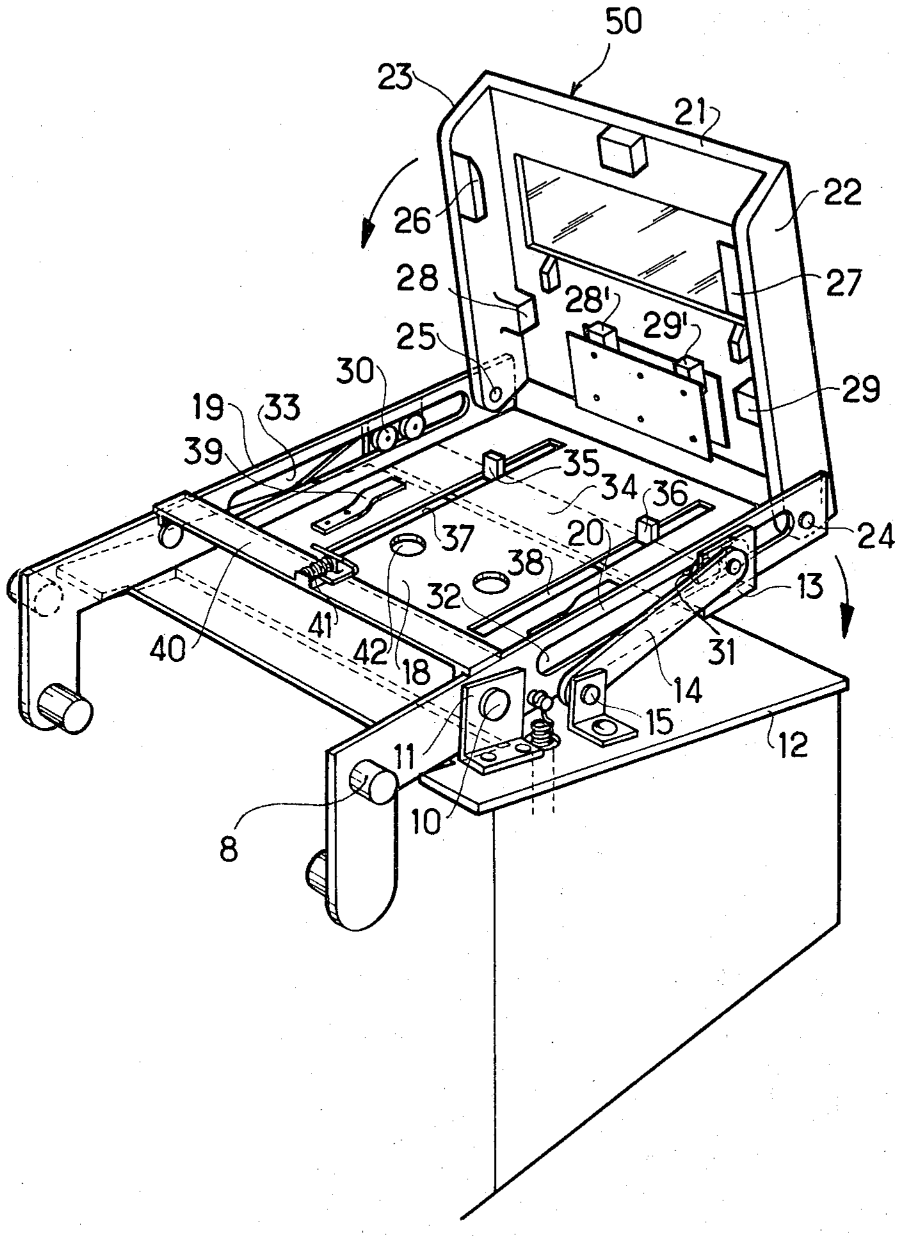
FIG. 2 is a perspective view of the complete system.

Referring to FIG. 2, the cassette-handling system comprises a cradle 18 with side walls 19 and 20 each forming a bar 9 of the mechanism shown in FIG. 1. The cradle 18 is pivoted to the fixed plate 12 about the horizontal axis defined by axles 10.

The cradle 18 cooperates with a housing 50 within which the cassette is received. It consists of a top 21 with perpendicular side walls 22 and 23 pivoted to the cradle side walls 20 and 19 at pivots 24 and 25 respectively. The housing 50 is shown in an open position in FIG. 2. Normally the housing is folded downwardly so that the side walls 22 and 23 lie inside the cradle side walls 20 and 19 respectively.

The side walls 22 and 23 carry respective cassette-guiding ramps 27 and 26 and respective catches 28 and 29 for holding an inserted cassette in position. Between the catches 28 and 29 recording and play back heads 28' and 29' respectively are attached to the housing top 21.

The carriages 13 of the mechanism shown in FIG. 1 are formed by the upwardly folded ends of a bar 34 extending transversely beneath the cradle 18. It runs in the longitudinal slots 32 and 33 in the cradle side walls 20 and 19 on rollers 30 and 31. Upstanding fingers 35 and 36 on the bar 34 project through longitudinal slots 37 and 38 in the cradle 18.

Leaf springs 39 are provided on the cradle floor for urging an inserted cassette against the housing top 21. At the end of the cradle remote from the heads 28' and 29' a cross piece 40 carries a screwed catch 41 by means of which the housing 50 may be locked in the normal position.

An aperture 42 is provided in the floor of the cradle 18 to admit a drive element of the cassette drive system located beneath plate 12, for driving the tape or wire of the cassette in the appropriate direction.

The cassette-handling system operates as follows: With the cradle in the cassette-receiving position A, as seen in FIG. 1, a cassette is slid horizontally into the housing 50, as indicated by the arrow 17. The cassette is free to enter the housing 50 since the cradle is angularly displaced from and therefore disengaged from the cassette drive system.

Rotation of the cam 1 pivots the cradle 18 clockwise about the axles 10 (as seen in FIGS. 1 and 2) to the cassette-driving position B in FIG. 1. In this position the cassette engages the cassette drive system, and the tape or wire contained in the cassette may be driven in either direction as required. This movement of the tape or wire can be carried out during continued rotation of the cam 1 or while the cam is stopped, depending on the duration of such movement. That portion between points MN on the cam profile (FIG. 1) is that in which the cradle is maintained in position B.

Further rotation of the cam 2 tilts the cradle 18 to the cassette-ejecting position (C in FIG. 1). During movement from position B to position C, the carriage 13 is drawn along the slot in bar 9, so that the fingers 35 and 36 move along the slots 37 and 38 in cradle 18 to eject the cassette from the housing 50.

A detector 43 may be provided for detecting an ejected cassette as it drops into a receiver 44. This detector may be arranged to provide a faulty operation indication if movement of the cradle to position C is not followed by entry of a cassette into the container 44.

A sensor 45 may be provided on the plate 12 and connected to the motor assembly 16 to inhibit operation of the motor when no cassette is present in the cradle or when the housing 50 is in the open position. In the open position of the housing 50 a cassette can be removed or inserted manually, and the cassette and/or cassette-handling system can be examined, in the event of faulty operation for example.

The detector 43 may be connected to the mechanism feeding cassettes to the cradle 18 so that if a cassette fails to be ejected from the cradle no further cassettes will be fed to the cradle until the fault has been rectified. The cassette feeder and the cam 1 may be driven by a common drive system of the type conventionally provided with such automatic feeding systems and operation thereof is suitably controlled in the well-known manner in response to detected conditions. For example, the detector 43 may provide the signal to the cassette feeder when a new cassette is to be loaded and the cassette feeder will then actuate cam 1 to the extent necessary to pivot cradle 18 to position B as soon as the new cassette has been loaded. Further driving of cam 1 to pivot cradle 18 to position C for ejecting the cassette may be effected by conventional detecting means which detects when the cassette has been fully played or upon manual control to eject the cassette.

The cassette ejector system may be housed entirely within the cradle 18, being connected to the links 14 through the slots 32 and 33 in the cradle side walls.

It will be appreciated that while this specification and the following claims refer throughout to a cassette, the system is equally suitable for use with tape or wire cartridges.

What we claim is:

1. A cassette-handling system comprising a cassette housing having guide and retaining means for guiding and holding a cassette, said housing having an opening in one end for receiving the cassette by movement of the cassette in its own plane, a casing containing a cassette drive system including a drive element projecting from said casing, a cradle pivoted to the casing and carrying said housing, said housing being pivoted to said cradle, and pivoting means for pivoting said housing and cradle from a loading position with the housing and cradle angularly disposed from the casing to a driving position against the casing so that said drive element of the cassette drive system engages the cassette for driving the medium contained therein, and then to an ejecting position, said cradle having an aperture therein, so that when the housing contains a cassette and is pivoted to lie against the cradle and the cradle is pivoted to lie against the casing, said drive element of the cassette drive system passes through said aperture in the cradle to engage the cassette and drive the medium contained therein.

2. A system as defined in claim 1, in which the pivot axes of the cradle and housing are parallel to each other.

3. A system as defined in claim 2, in which the housing has a top and a pair of parallel transverse side walls, its pivot axis extending perpendicularly between its parallel side walls.

4. A system as defined in claim 3, in which said cradle is of channel section with parallel side walls, each of its parallel side walls carrying one pivot of the housing.

5. A system as defined in claim 1, in which the housing and the cradle both have the form channel sections with parallel side walls and are arranged with their open sides face-to-face.

6. A system as defined in claim 5, in which the side walls of the housing are parallel to those of the cradle, the pivots connecting the cradle to the housing being perpendicular to the side walls.

7. A system as defined in claim 6, in which the cradle is provided with a cross piece carrying a screw catch for locking the housing in its closed position, in which position it lies against the cradle.

8. A system as defined in claim 1, wherein said pivoting means includes a linkage connected to the cradle, a cam, and a cam follower operatively associated with said linkage and said cam so that rotation of the cam pivots the cradle about its pivot axis to said respective loading, driving and ejecting positions.

9. A system as defined in claim 8, in which the cam is formed with two bosses defining respective cradle positions angularly displaced from said casing, a first of these positions being said loading position and the second of these positions being said ejecting position, and bias means for normally urging the cradle into the closed position against said casing.

10. A system as in claim 9, in which said cradle is formed of a cradle floor and a pair of parallel side walls, and further including a cassette-ejection mechanism comprising a link mounted on said cradle and pivoted about a fixed axis secured to said casing and an ejector finger connected to said link and mounted on said cradle to slide along the cradle floor to engage the cassette.

11. A system as defined in claim 10, in which the ejector finger passes through a slot in the cradle floor and is coupled to the end of said link by a bar mounted for sliding movement on the external surface of the cradle.

12. A system as defined in claim 11, in which said bar coupled to said link embraces the external cradle surface, its opposite end portions carrying respective rollers engaging in longitudinal guide slots formed in the cradle side walls.

13. A system as defined in claim 10, in which said ejector finger is carried on a bar sliding internally of the cradle and is coupled to the free end of the link through a longitudinal slot formed in the cradle side wall.

14. A system as in claim 1, including a receiver for ejected cassettes positioned adjacent said opening in said housing and provided with a cassette detector.

15. A system as defined in claim 2, in which the aperture for the admission of the cassette drive element is located between the pivot axes of the cradle and housing.

16. A system as defined in claim 1, comprising feeler means mounted on the casing for indicating faulty closure of the cradle or housing.

17. A system as defined in claim 1, comprising feeler means mounted on the casing for indicating absence of a cassette in the closed position of the cradle and housing.

* * * * *